US006476096B1

(12) United States Patent
Molloy et al.

(10) Patent No.: US 6,476,096 B1
(45) Date of Patent: Nov. 5, 2002

(54) INK JET PRINTER INK

(75) Inventors: Stuart Molloy, Essex (GB); John Philip Tatum, Cambridgeshire (GB)

(73) Assignee: Xaar Technology Limited, Cambridge (GB)

(*) Notice: Subject to any disclaimer, the term of this patent is extended or adjusted under 35 U.S.C. 154(b) by 0 days.

(21) Appl. No.: 09/615,238

(22) Filed: Jul. 13, 2000

Related U.S. Application Data

(63) Continuation of application No. PCT/GB99/00341, filed on Feb. 2, 1999.

(30) Foreign Application Priority Data

Feb. 2, 1998 (GB) .............................................. 9802210

(51) Int. Cl.$^7$ ......................... C09D 11/10; C08F 22/40; C08F 265/10; C08F 267/04; C08F 267/10
(52) U.S. Cl. ......................... 523/160; 525/282; 525/285
(58) Field of Search ................................. 523/160, 161; 106/31.27, 31.28, 31.57, 31.6, 31.85; 525/282, 285

(56) References Cited

U.S. PATENT DOCUMENTS

| | | | | | |
|---|---|---|---|---|---|
| 3,087,936 A | * | 4/1963 | Le Seur | ........................ | 548/405 |
| 3,202,678 A | * | 8/1965 | Stuart et al. | ................ | 458/546 |
| 4,822,710 A | | 4/1989 | Croucher et al. | ........... | 430/115 |
| 5,091,004 A | * | 2/1992 | Tabayashi et al. | ........ | 106/31.57 |
| 5,213,613 A | | 5/1993 | Nagashima et al. | ...... | 106/20 R |
| 5,378,574 A | * | 1/1995 | Winnik et al. | ............... | 430/115 |
| 5,688,312 A | * | 11/1997 | Sacripante et al. | ...... | 106/31.49 |
| 6,160,055 A | * | 12/2000 | Camberlin et al. | ...... | 525/326.7 |

FOREIGN PATENT DOCUMENTS

| | | | |
|---|---|---|---|
| EP | 061889 | * | 10/1982 |
| EP | 0 277 703 A1 | | 8/1988 |
| EP | 0 278 590 A1 | | 8/1988 |
| EP | 0 481 034 B1 | | 4/1992 |
| EP | 0 534 427 A2 | | 3/1993 |
| GB | 2081274 | * | 2/1982 |
| JP | 02070766 | * | 3/1990 |
| JP | 6-256698 | | 9/1994 |
| WO | WO 91/15425 | | 10/1991 |
| WO | WO 93/11866 | | 6/1993 |
| WO | WO 95/01404 | | 1/1995 |
| WO | WO 96/12772 | | 5/1996 |
| WO | WO 97/15633 | | 5/1997 |

OTHER PUBLICATIONS

"The Dispersibility and Stability of Carbon Black in Media of Low Dielectric Constant .1. Electrostatic and Steric Contributions to Colloidal Stability", Pugh et al., Elsevier Science Publishers B. V., Colloids and Surfaces, 7 (1983), pp. 183–207.

International Search Report in PCT/GB99/00341 dated May 17, 1999.

International Preliminary Examination Report in PCT/GB99/00341 dated Jun. 9, 2000.

* cited by examiner

*Primary Examiner*—Vasu Jagannathan
*Assistant Examiner*—Callie E Shosko
(74) *Attorney, Agent, or Firm*—Marshall, Gerstein & Borun

(57) ABSTRACT

An ink jet printer ink is provided in the form of a non-aqueous dispersion of colorant in a diluent and containing a dispersant for the colorant and which yields print having no discernible odor. The diluent comprises more than 50% by volume of white oil and the dispersant, which is employed in an amount of at least 20% by weight of the colorant, comprises at least one compound having both a long chain aliphatic group and at least one α, β-dicarboxylic acid moiety, e.g. a polyisobutylene succinimide.

20 Claims, No Drawings

INK JET PRINTER INK

This is a continuation of International Application No. PCT/GB99/00341 filed Feb. 2, 1999, the entire disclosure of which is incorporated herein by reference.

This invention relates to ink jet printer inks, and in particular to such inks comprising a dispersion of a solid pigment dye in a diluent.

In ink jet printing, a fluid ink is forced under pressure, and sometimes at elevated temperature, through a very small nozzle in a printing head. In one kind of printer, known as a "continuous" printer, ink droplets which are produced continuously are passed through a charging area where individual droplets receive an electrical charge in response to a signal and are directed towards a substrate to be printed. The droplets then pass through an electrical field causing them to be deflected by an amount which is dependent on the intensity of the charge and the field. Droplets not required to form print on the substrate are directed to a by-pass gutter. Inks for use in such printers need to be conductive.

In another kind of printer, known as a "drop-on-demand" (DOD) printer, the ink droplets are expelled from the nozzle of a print head only when required during the printing process. Drop-on-demand printers can use an electrostatically accelerated ink jet or droplet sequences ejected by pressure impulse actuation. In the latter kind of DOD printer, each drop of ink is individually ejected from a nozzle by means of pressure pulses induced e.g. by use of a piezoelectric actuator acting on the ink in the channel supplying the nozzle or by generation of a vapour bubble in response to a thermal pulse.

For an ink in the form of a dispersion to be suitable for use in modern ink jet printers, especially DOD printers, it must meet a number of essential criteria. It must be stable so that phase separation or sedimentation does not occur while the ink is in store or is in the head of the printer; it must have a sufficiently low viscosity that the energy requirements for firing it from a print head are acceptable; it must be capable of being fired from the printhead consistently in the form of single droplets of uniform size and it must dry quickly on the substrate to produce a printed dot of acceptable colour density and a well-defined regular outline. To meet these criteria requires the ink to have a viscosity, surface tension and vaporisation rate within certain well defined limits. It is also important that the ink does not wet the surface of the ink jet nozzle since this leads to the need to clean the nozzle frequently, thus interfering with long print runs. A measure of this property is the receding meniscus velocity (RMV) of the ink.

These properties of viscosity, surface tension, vaporisation rate and RMV are all a function of one or both of the diluent and the dispersant employed in the ink composition.

Dispersion inks tend to fall into two groups, those wherein the diluent is aqueous and those wherein it is essentially non-aqueous. Aqueous inks are essentially odourless but have certain shortcomings; in particular their drying rate is not as fast as most non-aqueous inks and the print tends not to be water fast. Non-aqueous inks are generally quicker drying and give water-fast print; however, the print from non-aqueous ink compositions developed hitherto has tended to exhibit an odour which is considered unpleasant by some users. There has therefore been a demand for an odourless or substantially odourless non-aqueous ink composition which retains the properties required of an ink jet printer ink, in particular, the necessary viscosity, surface tension, vaporisation rate, non-wetting characteristics and stability; specifically:

a viscosity of not greater than 35 mPa.s measured at 25° C. using a Bohlin CS Rheometer with a CP 4/40 measuring system; preferably no greater than 15 mPa.s, more preferably no greater than 12 mPa.s;

a surface tension in the range 22 to 36 mN.m at 25° C., more preferably 24 to 32;

a boiling point greater than 200° C.;

an RMV of at least 1.0 mm.sec$^{-1}$, measured as described in WO97/15633, more preferably at least 10 mm.sec$^{-1}$; and a stability such that the viscosity of the ink has not changed by more than 50%, preferably not more than 20% and more preferably not more than 10%, after 6 weeks ageing at 70° C. and there is no clear indication of phase separation of the said aged ink as evidenced by the observation of ink particles retained on a spatula which has been inserted in a vial containing the aged ink, rubbed along the bottom of the vial, and then withdrawn for examination.

WO95/01404 describes an ink jet ink comprising a liquid having an electrical resistance of at least $10^9$ ohm cm, insoluble marking particles and a particle charging agent. The ink is designed for use in the type of inkjet printer described in WO93/11866. This is a printer having a triangular shaped plate over which the ink flows continually. A charge is applied to the ink to charge the pigment particles which are electrostatically ejected onto the printing media, the majority of the solvent remains on the plate. The printer has no nozzle plate and as the ink flows continually over the plate the dispersant requirements of the ink are less stringent than those required in conventional inkjet printing. Succinimides are amongst the many classes of compound suggested as particle charging agents but there is no suggestion that succinimides may act as dispersants for the particles.

According to the present invention, there is provided an ink jet printer ink composition having a viscosity no greater than 35 m Pa.s comprising a dispersion of particulate pigment dye in a diluent and containing a dispersing agent from the pigment dye characterised in that the diluent comprises more than 50% by volume of white oil and the composition includes at least one dispersing agent comprising at least one compound having both an at least $C_{36}$ aliphatic group and at least one α, β-di-carboxylic acid imide moiety, said at least one dispersing agent being present in an amount of at least 20% by weight of the pigment dye, wherein the pigment dye is a non-carbon black colorant characterised as a pigment dye in The Color Index.

The white oils suitable for use in the invention will contain less than 5% aromatics by weight. Preferably, the white oil is free or substantially free of aromatic components; that is to say it contains not more than 1% aromatics. Technical grade white oils are suitable and medicinal and food-grade white oils are preferred. The diluent may contain at least one other liquid component in addition to the white oil provided the white oil forms the major component of the diluent by volume and the diluent remains single phase. Thus, water, if present, must be in an amount which is miscible with or soluble in the other component or components of the diluent. Examples of other components that may be included in admixture with the white oil are other organic liquids provided that they do not interfere with colour, odour and/or stability. While the inclusion of such other organic liquids is not essential, it may be desirable in some cases to include at least one polar organic liquid, to enhance stability. Liquid fatty acid esters form a preferred class of such liquids. The amount of fatty acid ester that may be used will depend upon its nature and properties, eg. volatility, and upon the choice of other components in the formulation but amounts of up to 20% by volume have generally been found acceptable. Even higher amounts may be found useful is some formulations.

"Pigments dyes" as that term is used herein means those non-carbon black colorants characterised as pigment dyes in The Colour Index Examples of suitable pigments include those within the ranges having the following CI classifications:

| Colour | CI Number |
| --- | --- |
| Green | PG 7 and 36 |
| Orange | PO 5, 36, 38, 43, 51, 60, 62, 64, 66, 67 and 73 |
| Red | PR 112, 149, 170, 178, 179, 185, 187, 188, 207, 208, 214, 220, 224, 242, 251, 255, 260 and 264 |
| Magenta/Violet | PV 19, 23, 31, and 37 and PR 122, 181 and 202 |
| Yellow | PY 17, 120, 168, 175, 179, 180, 181 and 185 |
| Blue | PB 15 |

Examples of specific pigments include IRGALITE BLUE GLVO, MONASTRAL BLUE FGX, IGRALITE BLUE GLSM, IRGALITE BLUE GLNF, HELIOGEN BLUE L7101F, LUTETIA CYANINE ENJ, HELIOGEN BLUE L6700F, MONASTRAL GREEN GNX-C, MONASTRAL GBX, MONASTRAL GLX, MONASTRAL 6Y, IRGAZIN DPP ORANGE RA, NOVAPERM ORANGE H5G70, NOVPERM ORANGE HL, MONOLITE ORANGE 2R, NOVAPERM RED HFG, HOSTAPERM ORANGE HGL, PALIOGEN ORANGE L2640, SICOFAST ORANGE 2953, IRGAZIN ORANGE 3GL, CHROMOPTHAL ORANGE GP, HOSTAPERM ORANGE GR, PV CARMINE HF4C, NOVAPERM RED F3RK 70, MONOLITE RED BR, IRGAZIN DPP RUBINE TR, IRGAZIN DPP SCARLET EK, RT-390-D SCARLET, RT-280-D RED, FORTHBRITE RED JSM, NOVAPERM RED HF4B, NOVAPERM RED HF3S, NOVAPERM RD HF2B, VYNAMON RED 3BFW, CHROMOPTHAL RED G, VYNAMON SCARLET 3Y, PALIOGEN RED L3585, NOVAPERM RED BL, PALIOGEN RED 3880 HD, HOSTAPERM RED P2GL, HOSTAPERM RED P3GL, HOSTAPERM RED E5B 02, SICOFAST RED L3550, SUNFAST MAGENTA 122, SUNFAST RED 122, SUNFAST VIOLET 19 228–0594, SUNFAST VIOLET 19 228–1220, CINQUASIA VIOLET RT-791-D, VIOLET R NRT-201-D, RED B NRT-796-D, VIOLET R RT-101-D, MONOLITE VIOLET 31, SUNFAST MAGENTA 22, MAGENTA RT-243-D, MAGENTA RT 355-D, RED B RT-195-D, CINQUASIA MAGENTA RT-385-D, MONOLITE VIOLET R, MICROSOL VIOLET R, CHROMOPTHAL VIOLET B, ORACET PINK RF, FANAL PINK D4830, IRGALITE YELLOW 2GP, IRGALITE YELLOW WGP, PV FAST YELLOW HG, PV FAST YELLOW H3R, HOSTAPERM YELLOW H6G, PV FAST YELLOW, PALIOTOL YELLOW D1155, PALIOTOL YELLOW D0960, NOVAPERM YELLOW 4G and IRGAZIN YELLOW 3R.

Mixtures of pigment dyes may be employed, if desired, including mixtures of pigments and mixtures of one or more dyes with one or more pigments.

In one preferred embodiment of the invention, the pigment are chosen to give the widest range of colours and tones in a hexachrome system.

The amount of pigment dye employed will depend upon the choice of pigment dye and the intensity of colour required in the print derived from the ink but will normally be in the range of from 2 to 20 by weight of the ink composition, more preferably from 4 to 15 by weight.

The dispersant systems employed hitherto for stabilising dispersions of pigment dyes in essentially non-aqueous diluents tend not to be suitable for use in the inks of the present invention because inks containing them tend to have an unacceptable odour. In accordance with the present invention, however, it has been found that this problem may be overcome by using as the dispersant at least one compound containing an at least $C_{36}$ aliphatic group and an $\alpha$, $\beta$-di-carboxylic acid imide moiety. By an aliphatic group is meant in this context an alkyl or alkenyl group. The alkenyl group may contain one or more than one unsaturated carbon-carbon group. The group may comprise a polymer or oligomer of an olefin or mixture of olefins, eg. polyisobutene, polybutadiene or ethylene/propylene copolymer. The preferred chain length appears to depend upon the nature of the polyolefin. For polyisobutene, the molecular weight is preferably in the range 700 to 5000. For ethylene/propylene copolymers, however, higher molecular weights may be preferred.

In one preferred embodiment, the $\alpha$, $\beta$-di-carboxylic acid in moieties are cyclic e.g. as in dicarboxylic acid imide, succinimides. The moiety may be attached directly to the at least $C_{36}$ aliphatic group or indirectly via an intermediate atom or group. Compounds containing these moieties may be obtained, for example, by grafting an $\alpha$, $\beta$-ethylenically unsaturated dicarboxylic acid imide to an olefin polymer or copolymer of the desired chain length.

In one preferred embodiment, the compound is selected from an at least C36 alkyl and alkenyl imide such as polyalkenyl succinimides. Such compounds are obtainable, for example, by grafting an $\alpha$, $\beta$-ethylenically unsaturated dicarboxylic acid anhydride, typically maleic anhydride, on to a polyolefin, e.g. polyisobutylene or an ethylene/propylene. copolymer, and reacting the product with a mono- or poly-amine to form an N-substituted succinimide. Compounds containing at least one amino nitrogen atom have been found particularly suitable. Examples of suitable compounds are those marketed under the trade name OLOA by Chevron, eg. OLOA 1200; certain products marketed under the trade name SAP by Shell, eg. SAP 220 TP, SAP 230 TP and SAP 285, materials marketed by Lubrizol under the code numbers 2153 and 2155, and materials marketed by Exxon under the trade name Paranox, eg. as in Paranox 105.

Having regard to the known propensity for compounds having amine groups to have a noticeable odour and, moreover, generally to exhibit an odour that is considered by many to be unattractive, it is surprising that the inks of the present invention employing these compounds as dispersants are found to be substantially odourless.

In a further embodiment, one or more of the compounds having both an at least $C_{36}$ aliphatic group and at least one $\alpha$, $\beta$-di-carboxylic acid imide moiety may be used as the dispersant in conjunction with at least one anhydride since this may result in enhancement of the stability of the ink composition. This is particularly advantageous if the pigment dye includes a component having a basic reaction, eg. as in the case of many black and cyan pigments.

In the embodiment, the anhydride is at least one compound having both an at least $C_{36}$ aliphatic group and at least one $\alpha$, $\beta$-di-carboxylic acid moiety anhydride, eg. derivable from succinic anhydride. Such compounds are obtainable, for example, by grafting an $\alpha$, $\beta$-ethylenically unsaturated dicarboxylic acid anhydride, eg. maleic anhydride, onto a polyolefin, eg. polyisobutylene, polybutadiene, or ethylene propylene copolymer. The grafted product may contain one, or more than one, anhydride group attached to the polyolefin backbone. An example of a suitable compound is Lithene N4-5000-3.5MA available from Revertex Chemicals.

In another preferred embodiment of the invention, at least one of the above-defined dispersant compounds also includes boron since its presence appears to improve one or both of stability and the RMV of the ink. Examples of suitable materials are Paranox 106 and Paranox 1273 for Exxon. The use of boron-containing materials is particularly advantageous where the pigment dye is a pigment having a basic reaction, eg. as in many black and cyan pigments.

It has been found that for any given pigment dye, better results are obtainable with some of the above dispersants than with others and thus the choice of dispersant (or dispersants where more than one is used) may depend to some extent on the choice of pigment dye. Variation of the composition of the diluent may also have an effect on one or more properties of the ink, including stability, and may thus necessitate adjustment of the nature and/or concentration of the dispersant.

The amount of dispersant required will depend on the particular dispersant employed and choice of pigment dye. However, below 20% of dispersant based on the weight of pigment dye, it is difficult or impossible to obtain stable dispersions with the formulations of the present invention. Preferably, the dispersant is employed-in an amount of 20 to 150% by weight of the pigment dye, preferably 40 to 100%.

The stability of the ink composition of the invention is in many cases dependent upon the nature of the pigment dye and it has been found that stability may be increased in many of such cases by the inclusion of further dispersants and/or dispersant synergists. It is preferred that the composition is still stable in the sense of exhibiting a viscosity rise of no greater than 50% and no clear indication of phase separation in the test defined above, after at least 12 weeks at 70° C.

In addition to the diluent, dispersant(s) and pigment dy other components conventionally included in ink jet ink dispersion composition, eg. dispersant synergists and viscosity modifiers, may be included in the compositions of the present invention. Examples of such dispersant synergists are those marketed by Zeneca Colours under the trade name Solsperse. Examples of viscosity modifiers are Indopol L-100, a polyisobutylene available from Amoco and long chain alkyl alcohols such as Novol, an oleyl alcohol available from Croda.

The invention is now illustrated but in no way limited by the following Examples in which all parts are by weight except where otherwise indicated. The inks described in these Examples were prepared in the following manner. An initial dispersion is formed from the dispersant, pigment and a small amount of diluent, and the dispersion so obtained is then let down to the required pigment concentration by the addition of further diluent. All the ink compositions described in the following Examples were dispersions which had a viscosity of 35 mPa.s or less at 25° C., a boiling point greater than 200° C. and an RMV of at least 1.0 mm.sec$^{-1}$; and could readily be fired from a 128 channel drop-on-demand piezo ink jet printhead of the kind described in EP-A-0277703 and EP-A-0278590 to yield a well defined print of good colour density on plain paper without the need to modify the paper surface. The print from these inks had no discernible odour.

Examples 1–3

Three inks were prepared having the following compositions:

| Example | 1 | 2 | 3 |
|---|---|---|---|
| Hostaperm Red E5B02 | 5 | — | — |
| Fanal Pink | — | 5 | — |
| Palitol Yellow D1155 | — | — | 5 |
| OLOA 1200 | 3 | 2.25 | 2 |
| Estisol 312 | 4 | 8 | 0 |
| Lytol | 88 | 84.75 | 93 |

Estisol 312 is a mixture of saturated coconut fatty acid esters available from Halterman Ltd of Barnet, England.

All three ink compositions were still stable after at least 6 weeks at 70° C.

Example 4

An ink was prepared with the following composition (parts expressed as by weight)

Irgalite Blue GLVO 5

Solsperse 5000 0.5

OLOA 1200 2.9

Lithene N4-5000-3.5MA 0.8

Lytol 90.8.

Solsperse 5000 is a substituted ammonium phthalocyanine-type dispersant synergist available from Zeneca Colours.

The ink showed no significant change in viscosity after 6 weeks at 70° C. No further significant improvement over that obtained using 0.8 parts of the Lithene was observed when the amount of Lithene was doubled to 1.6 parts.

Examples 5–21

The following formulations are further examples of ink jet printing inks according to the invention.

Wherein:

Dispersants:

A=OLOA 1200

B=Lythene N45000-3.5MA

C=Lubrizol 2153

D=Lubrizol 2155

E=SAP 210

F=SAP 285

G=Paranox 106

H=Paranox 1273

J=Paranox 105

Dispersant Synergists:

K=Solsperse 5000

L=Solsperse 22000

M=OLOA 219

| EXAMPLE NO | 5 | 6 | 7 | 8 |
|---|---|---|---|---|
| PIGMENTS | | | | |
| Hostaperm Red ESB02 | 9 | | 5 | |
| Cinquasia Magenta RT 235-D | | | | |
| Fanal Pink D4830 | | 5 | | |
| Irgalite Blue GLVO | | | | 0.1 |
| Paliotol Yellow D1155 | | | | |
| Sunfast Violet 19228022 | | | | |
| Forthbrite Red JSM | | | | |
| DISPERSANTS | A5.4 | A2.25 | A3 | A0.08 |
| DISPERSANT SYNERGISTS | M0.45 | | | K0.01 |
| WHITE SPIRIT SOLVENTS | | | | |
| Klearol | 30.15 | | 77 | |
| Lytol | 55 | 72.75 | 15 | 99.81 |
| COSOLVENTS | | | | |
| Estisol 312 | | 20 | | |
| ADDITIVES | | | | |
| Indopol L-100 | | | | |
| Novol | | | | |
| Uravar FN5 | | | | |

| EXAMPLE NO | 9 |
|---|---|
| PIGMENTS | |
| Hostaperm Red ESB02 | |
| Cinquasia Magenta RT 235-D | |
| Fanal Pink D4830 | |
| Irgalite Blue GLVO | |
| Palitol Yellow D1155 | 5 |
| Sunfast Violet 19228022 | |
| Forthbrite Red JSM | |
| DISPERSANTS | A2.5 |
| DISPERSANT SYNERGISTS | M0.05 |
| WHITE SPIRIT SOLVENTS | |
| Klearol | 77.45 |
| Lytol | |
| COSOLVENTS | |
| Estisol 312 | |
| ADDITIVES | |
| Indopol L-100 | 15 |
| Novol | |
| Uravar FN5 | |

| EXAMPLE NO | 10 | 11 |
|---|---|---|
| PIGMENTS | | |
| Hostaperm Red ESB02 | | |
| Cinquasia Magenta RT 235-D | | |
| Fanal Pink D4830 | | |
| Irgalite Blue GLVO | 5 | 5 |
| Palitol Yellow D1155 | | |
| Sunfast Violet 19228022 | | |
| Forthbrite Red JSM | | |
| DISPERSANTS | E 3 | F 2 |
| DISPERSANT SYNERGISTS | | |

-continued

| EXAMPLE NO | 10 | 11 |
|---|---|---|
| WHITE SPIRIT SOLVENTS | | |
| Klearol | 62 | 68 |
| Lytol | 30 | 25 |
| COSOLVENTS | | |
| Estisol 312 | | |
| ADDITIVES | | |
| Indopol L-100 | | |
| Novol | | |
| Uravar FN5 | | |

| EXAMPLE NO | 12 | 13 |
|---|---|---|
| PIGMENTS | | 9 |
| Hostaperm Red ESB02 | | |
| Cinquasia Magenta RT 235-D | | |
| Fanal Pink D4830 | 5 | |
| Palitol Yellow D1155 | | |
| Sunfast Violet 19228022 | | |
| Forthbrite Red JSM | | |
| DISPERSANTS | G1.75 | G4.25 |
| DISPERSANT SYNERGISTS | | |
| WHITE SPIRIT SOLVENTS | | |
| Klearol | | 30 |
| Lytol | 93.25 | 56.75 |
| COSOLVENTS | | |
| Estisol 312 | | |
| ADDITIVES | | |
| Indopol L-100 | | |
| Novol | | |
| Uravar FN5 | | |

| EXAMPLE NO | 14 | 15 | 16 | 17 |
|---|---|---|---|---|
| PIGMENTS | | | | |
| Hostaperm Red ESB02 | | | | |
| Cinquasia Magenta RT 235-D | | | | |
| Fanal Pink D4830 | | | | 5 |
| Irgalite Blue GLVO | 5 | 5 | | |
| Palitol Yellow D1155 | | | | |
| Sunfast Violet 19228022 | | | | |
| Forthbrite Red JSM | | | 5 | |
| DISPERSANTS | G 3 | G 3 | G 2 | H1.5 |
| DISPERSANT SYNERGISTS | K0.25 | K0.5 | | |
| WHITE SPIRIT SOLVENTS | | | | |
| Klearol | 55 | | 60 | |
| Lytol | 36.75 | 66.5 | 32.6 | 93.5 |
| COSOLVENTS | | | | |
| Estisol 312 | | | | |
| ADDITIVES | | | | |
| Indopol L-100 | | | | |
| Novol | | 25 | | |
| Uravar FN5 | | | | 0.4 |

| EXAMPLE NO | 18 | 19 | 20 |
|---|---|---|---|
| PIGMENTS | | | |
| Hostaperm Red ESB02 | 9 | | |
| Cinquasia Magenta RT 235-D | | | |
| Fanal Pink D4830 | | | |
| Irgalite Blue GLVO | | | 5 |
| Palitol Yellow D1155 | | 5 | |
| Sunfast Violet 19228022 | | | |
| Forthbrite Red JSM | | | |
| DISPERSANTS | G4.25 | A 3 | J2.5 |
| DISPERSANT SYNERGISTS | | L0.05 | K0.5 |
| WHITE SPIRIT SOLVENTS | | | |
| Klearol | 5.85 | | |
| Lytol | 80.9 | 71.95 | 92 |
| COSOLVENTS | | | |
| Estisol 312 | | | |
| ADDITIVES | | | |
| Indopol L-100 | | 20 | |
| Novol | | 25 | |
| Uravar FN5 | | | |

Example 21

An ink according to the invention was formed having the following formulation

Forthbrite Red JSM 5 parts

Paranox 106 1.25 parts

Lytol 93.75 parts

In a repeat experiment reducing the level of Paranox 106 to 0.74 part and increasing the level of Lytol to 94.26 parts, it was not possible to obtain a stable dispersion.

Example 21

An ink according to the invention was formed having the following formulation

Forthbrite Red JSM 5 parts

Paranox 106 1.25 parts

Lytol 93.75 parts

In a repeat experiment reducing the level of Paranox 160 to 0.74 part and increasing the level of Lytol to 94.26 parts it was not possible to obtain a stable dispersion.

What is claimed is:

1. An ink jet printer ink having a viscosity no greater than 15 mPas at 25° C. comprising a dispersion of particulate pigment dye in a diluent and containing a dispersing agent for the pigment dye wherein the diluent comprises more than 50% by volume of white oil and the composition includes at least one dispersing agent comprising at least one compound having both an at least $C_{36}$ alkyl group or alkenyl group containing at least one unsaturated carbon-carbon bond and at least on α,β-dicarboxylic acid imide moiety, said dispersing agent being present in an amount of at least 20% by weight of said pigment dye, wherein the pigment dye is a non-carbon black colorant.

2. An ink jet printer ink of claim 1 wherein said compound is obtainable by a process including the step of grafting an α, -β ethylenically unsaturated dicarboxylic acid imide to an olefin polymer or copolymer.

3. An ink jet printer ink of claim 1 wherein said olefin is a polybutadiene, polyisobutene or ethylene/propylene copolymer.

4. An ink jet printer ink of claim 1 wherein said α,β-dicarboxylic acid moiety is cyclic.

5. An ink jet printer ink of claim 1 wherein said compound comprises an at least $C_{36}$ polyalkenyl succinimide.

6. An ink jet printer ink of claim 5 wherein said compound is an N-substituted succinimide obtainable by reacting a polyisobutylene-graft-maleic anhydride with an amine.

7. An ink jet printer ink of claim 6 wherein said N-substituted succinimide contains at least one amino nitrogen atom.

8. An ink jet printer ink of claim 5 wherein said compound includes boron.

9. An ink jet printer ink of claim 8 wherein the pigment dye comprises a basic group.

10. An ink jet printer ink of claim 9 wherein said pigment dye component is selected from black pigments and cyan pigments.

11. An ink jet printer of claim 1 wherein said compound is used in conjunction with at least one anhydride present in an amount of up to 50 per cent by weight of the pigment dye.

12. An ink jet printer ink of claim 11 wherein the pigment dye comprises a basic group.

13. An ink jet printer of claim 12 wherein said pigment dye component is selected from black pigments and cyan pigments.

14. An ink jet printer ink of claim 1 wherein the compound or compounds forming the dispersing agent is or are present in an amount of from 20 to 150 per cent by weight of the pigment dye.

15. An ink jet printer ink of claim 1 wherein the diluent includes at least one polar organic compound.

16. An ink jet printer ink of claim 15 wherein the diluent includes at least one compound selected from fatty acid esters and long chain alcohols.

17. An ink jet printer of claim 1 wherein said imide moiety is an N-substituted imide group.

18. An ink jet printer ink of claim 1 wherein the pigment dye comprises a basic group.

19. An ink jet printer ink of claim 18 wherein said pigment dye component is selected from black pigments and cyan pigments.

20. An ink jet printer of claim 1 having a viscosity no greater than 12 mPas.

* * * * *